UNITED STATES PATENT OFFICE.

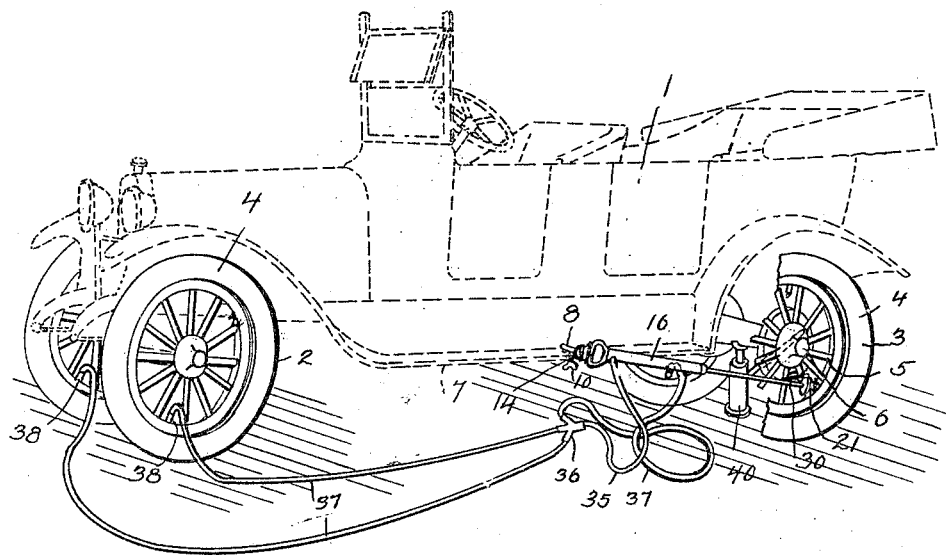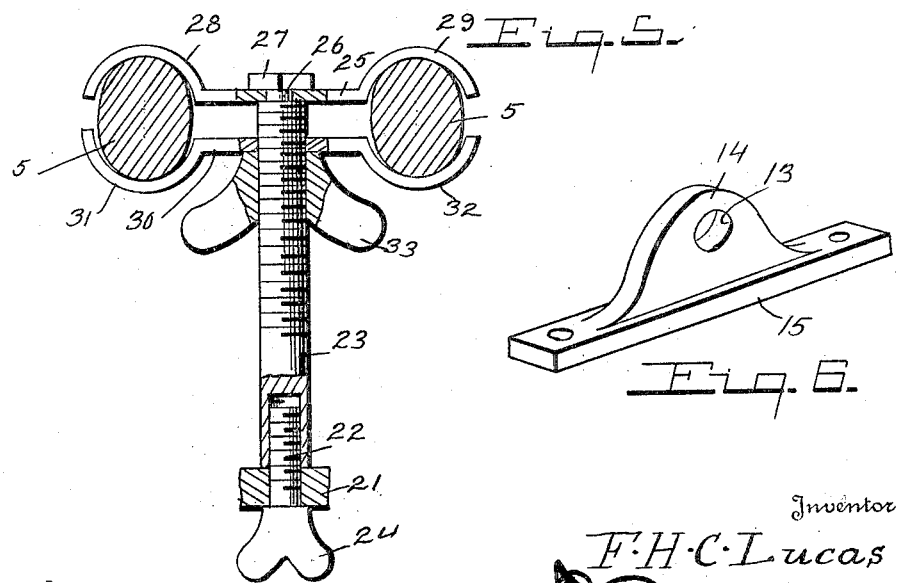

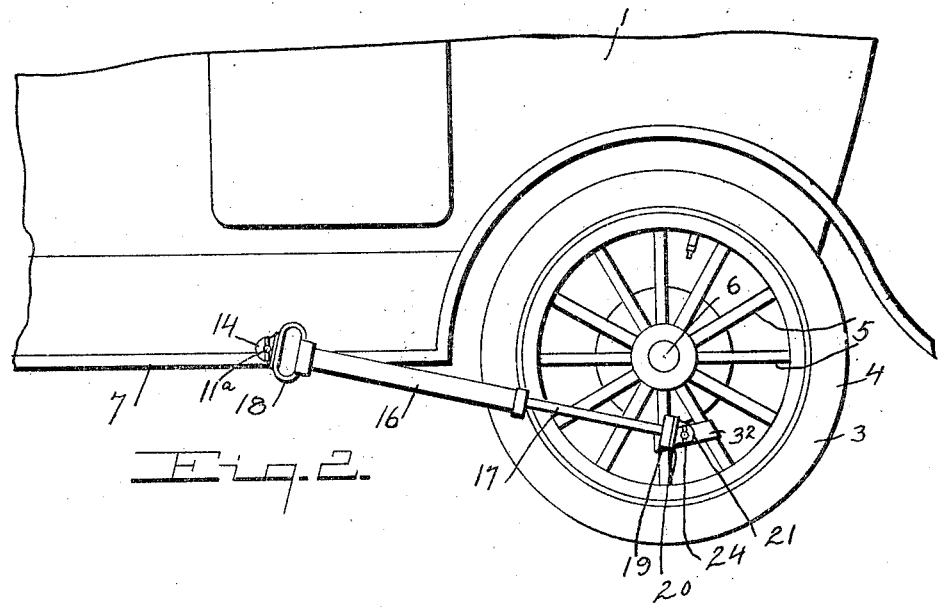
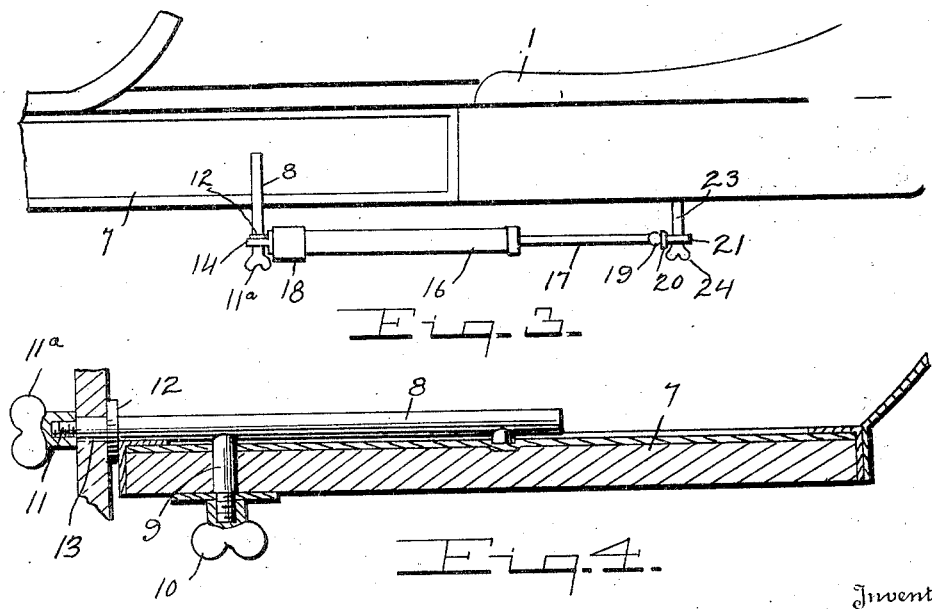

FREDERICK H. C. LUCAS, OF CHICO, CALIFORNIA.

TIRE-INFLATING DEVICE.

1,206,560.

Specification of Letters Patent.     Patented Nov. 28, 1916.

Application filed January 8, 1915. Serial No. 1,218.

*To all whom it may concern:*

Be it known that I, FREDERICK H. C. LUCAS, a citizen of the United States, residing at Chico, in the county of Butte and State of California, have invented certain new and useful Improvements in Tire-Inflating Devices; and I do hereby declare the following to be a full, clear, and exact description of the invention, such as will enable others skilled in the art to which it appertains to make and use the same.

This invention relates to a device for inflating the inner tubes of pneumatic tires such as are used upon automobiles, and the primary object of the invention is to associate with an ordinary tire inflating pump, suitable supporting brackets and mechanism for operating the pump by the rotation of one of the traction wheels of the vehicle, and to inflate three of the tires at the same time.

Another object of this invention is to provide a novel form of bracket for connecting one end of an ordinary tire inflating pump to the running board of an ordinary automobile, and the other end, or the handle end of the piston rod to the spokes of one of the traction wheels of the vehicle, for operating the pump during the rotation of the wheel for inflating the inner inflatable tubes of the pneumatic tire.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a perspective view of an automobile showing the invention applied thereto. Fig. 2 is a fragmentary side elevation of an automobile showing the manner of attaching the inflating pump to the same. Fig. 3 is a top plan view of Fig. 2. Fig. 4 is a detail sectional view through the running board showing the manner of connecting the foot of the pump to the running board. Fig. 5 is a detail view partially in section of the manner of connecting the piston rod of the pump to the spokes of one of the wheels of the vehicle, and Fig. 6 is a detail perspective view of a part of the invention.

Referring more particularly to the drawings, 1 designates an automobile of any desired type now upon the market, which has front and rear wheels 2 and 3, upon the peripheries of which are mounted the ordinary type of inflatable tires 4. The rear wheel 3 has spokes 5 of the ordinary type radiating from the hub section 6 thereof and connected to the inner surface of the rim of the wheel.

The running board 7 of the automobile 1 has mounted upon the upper surface thereof a rod 8, which is held in place by the insertion of a spur 9 which is formed upon the rod, through the running board, and by mounting a winged nut 10 upon the lower end of the spur 9 which projects through the running board 7, thereby securely clamping the rod 8 upon the upper surface of the running board. The rod 8 has its outer end externally screw threaded as is shown at 11, and it has a collar 12 mounted thereupon, and spaced inwardly from the screw threaded end 11. The screw threaded end 11 of the rod 8 extends beyond the outer edge of the running board 7, and is inserted through an eye or opening 13 which is formed in a plate or bracket 14. The plate or bracket 14 is formed integrally with and extends transversely from a supporting base plate 15, which is secured in any suitable manner to the lower or foot end of an ordinary air pump 16, used for inflating the inner tubes of pneumatic tires.

The pump 16 is of the ordinary type of pump, having a piston (not shown) mounted therein, and a piston rod 17 projecting out of the end opposite to the foot end 18, to which the supporting base plate 15 is attached. The piston rod 17 has a handle 19 formed upon the outer end of the same, to which a plate 20 is secured. The plate 20 is similar in construction to the plate 15, having a transversely extending ear 21 formed thereupon, which is provided for seating upon the end of a stud 22, which is carried by the hollow outer end of a rod 23. The ear 21 is securely held upon the stud 22 by a winged or thumb nut 24, which is mounted upon the outer end of the stud and forces the ear against the outer end of the hollow rod 23 as is clearly shown in Fig. 5 of the drawings. The plate 14 is held securely mounted upon the rod 8 by a winged nut 11ª which is mounted upon the externally screw threaded end 11 of the rod, as is clearly shown in Fig. 4 of the drawings.

The rod 23 is provided with external screw threads formed upon its inner end, which has a plate 25 rotatably mounted upon the reduced section 26 thereof, and held in place by a nut 27. The plate 25 projects upon opposite sides of the rod 23 and has substantially semi-circular sockets or pockets 28 and 29 formed upon its outer ends, which are provided for receiving or mounting upon two adjacent spokes of the spokes 5 of one of the rear wheels 3 of the vehicle 1. The rod 23 has a second plate 30 mounted thereupon, which plate extends upon opposite sides of the rod and has pockets 31 and 32 formed upon its ends, which are provided for engagement with the respective spokes of the wheel which are engaged by the pockets 28 and 29, and diametrically opposite of the pockets 28 and 29, for securely clamping the rod 23 in connection to the spoke, as is clearly shown in Figs. 1 and 5 of the drawings. A winged nut 33 is mounted upon the exterior screw threaded section of the rod 23 and is provided for clamping the plate 32 securely in engagement with the spokes 5 of one of the rear wheels 3 of the automobile 1.

The outlet tube 35 of the pump 16 has a pronged connection or coupling 36 connected thereto, to which are connected a plurality of flexible tubes 37. The tubes 37 extend through the air valves 38 carried by the front wheel of the automobile and one of the rear wheels of the automobile as is clearly shown in Fig. 1 of the drawings. The wheels 3 to which the pump piston rod 17 is connected, does not have connection with the pump cylinder, owing to the fact that this wheel is provided for rotation for operating the pump for forcing air through the various tubes 37 into the inner inflatable tubes of the various pneumatic tires 4 of the wheels of the vehicle.

In the operation of the improved device heretofore described; when it is desired to inflate the pneumatic tires of an automobile the rear axle is jacked up, by means of an ordinary type of jack shown at 40 in Fig. 1 of the drawings, so that one of the wheels thereof will be positioned above the ground or floor upon which the automobile is mounted, for independent rotation. The other rear wheel is held against rotation. After one of the rear wheels 3 of the vehicle has been properly elevated the pump 16 is clamped to the running board 7 of the vehicle, as heretofore described, and the handle 19 is clamped to two adjacent spokes of the wheel 3 which is elevated, by means of the bracket heretofore described for this purpose. After the pump has been properly attached to the vehicle, power is imparted to the rear wheel 3, which rotates the same, and operates the piston rod 17 of the pump, in a reciprocatory manner for forcing air through the various tubes 37 into the pneumatic tires 4. The piston rod 17 of the pump is clamped to the rear wheel 3 eccentrically of the center of the wheel, so that a reciprocatory movement will be imparted to the piston rod upon the rotation of the wheel.

From the foregoing description taken in connection with the accompanying drawings the advantage of construction and of the method of operation of the improved tire inflating device will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A tire inflating device comprising a rod having one of its ends screw-threaded, a spur formed on said rod and extending through the running board of an automobile, a nut on said spur and in engagement with the running board, a plate mounted on the end of said rod, a nut mounted on the screw-threaded end of the rod to said plate into engagement with the running board, a base formed on said plate, an air pump secured to the base, means for detachably securing the piston rod of the pump to the rear wheel of the automobile, and means for connecting the tires of the automobile to said pump.

In testimony whereof I affix my signature in presence of two witnesses.

FREDERICK H. C. LUCAS.

Witnesses:
W. A. SWIFT,
M. P. PILLSBURY.